(No Model.)

J. R. LITTLE.
MANUFACTURE OF METAL WHEELS.

No. 313,004. Patented Feb. 24, 1885.

Witnesses:
Jas. E. Hutchinson.
Henry C. Hazard.

Inventor.
Jas. R. Little, by
Prindle & Russell, his Attys.

N. PETERS, Photo-Lithographer, Washington, D. C.

United States Patent Office.

JAMES R. LITTLE, OF QUINCY, ILLINOIS, ASSIGNOR, BY MESNE ASSIGNMENTS, TO THE QUINCY METAL WHEEL COMPANY, OF SAME PLACE.

MANUFACTURE OF METAL WHEELS.

SPECIFICATION forming part of Letters Patent No. 313,004, dated February 24, 1885.

Application filed June 2, 1884. (No model.)

*To all whom it may concern:*

Be it known that I, JAMES R. LITTLE, of Quincy, in the county of Adams, and in the State of Illinois, have invented certain new and useful Improvements in the Manufacture of Metal Wheels; and I do hereby declare that the following is a full, clear, and exact description thereof, reference being had to the accompanying drawings, making a part of this specification, in which—

Figure 1:
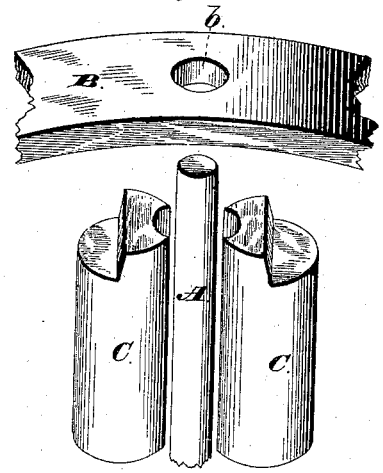
Figure 2:
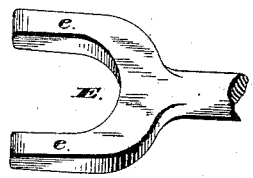
Figure 2:
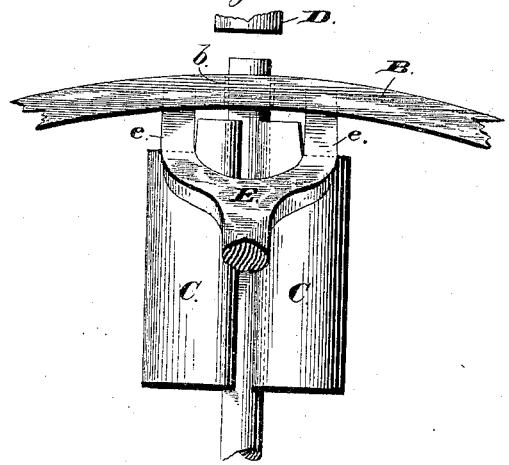

Figure 1 is a perspective view of the apparatus employed for carrying into effect my improved process, and Fig. 2 is a front elevation of the same while in use.

Letters of like name and kind refer to like parts in each of the figures.

My invention relates to the construction of metal wheels in which the spokes are secured within the rim or felly by lateral expansion; and it consists in the method of centering the felly or rim while securing the spokes in place, substantially as and for the purpose hereinafter specified.

In the construction of metal wheels by my invention each spoke A is loosely inserted within an opening, b, in the rim or felly B, and then compressed longitudinally at its outer end until it closely fills said opening, which operation is performed by clasping the spoke between suitable jaws, C, at a point near the inner side of said rim, and then causing a plunger, D, to impinge upon the projecting end of said spoke. The longitudinal compression of the spoke A causes it to fill the opening b; but before the latter is solidly filled, the friction between its sides and said spoke will be sufficient to cause the rim B to be moved radially inward as much as said spoke is afterward shortened. To insure the radial position of said rim after the clamping-jaws C have been closed, and before the plunger D moves downward, a forked bar, E, has its ends e passed between said rim and the upper ends of said jaws upon each side of said spoke, and by a downward pressure upon its outer end said rim is raised to the required point and there held, while said plunger descends and unites said spoke end and rim, as before described. This method is applied to each spoke, and by exercising judgment as to the amount of upward spring to be given to the rim each time before the plunger is permitted to act said rim, when all of the spokes are attached, will be concentric with the axis of the wheel and will run truly.

Having thus fully set forth the nature and merits of my invention, what I claim as new is—

As an improvement in the construction of metal wheels, the method of securing the spokes to the rim and of centering said rim, consisting in first clamping a spoke between jaws at a point near the inner side of the rim, then springing said rim upward above said jaws, and, finally, compressing said spoke longitudinally from its outer end until it closely fills the opening or mortise within said rim, substantially as specified.

In testimony that I claim the foregoing I have hereunto set my hand this 7th day of April, A. D. 1884.

JAMES R. LITTLE.

Witnesses:
F. M. McCANN,
JOHN W. RICKART.